United States Patent
Butler

(10) Patent No.: US 10,572,575 B2
(45) Date of Patent: Feb. 25, 2020

(54) SYSTEM INDEPENDENT FONT RENDERING

(71) Applicant: Oracle International Corporation, Redwood Shores, CA (US)

(72) Inventor: Antoine Duane Butler, Raleigh, NC (US)

(73) Assignee: Oracle International Corporation, Redwood Shores, CA (US)

( * ) Notice: Subject to any disclaimer, the term of this patent is extended or adjusted under 35 U.S.C. 154(b) by 180 days.

(21) Appl. No.: 14/486,279

(22) Filed: Sep. 15, 2014

(65) Prior Publication Data

US 2016/0078004 A1 Mar. 17, 2016

(51) Int. Cl.
*G06F 17/20* (2006.01)
*G06F 17/21* (2006.01)
*G06F 21/10* (2013.01)

(52) U.S. Cl.
CPC ............ *G06F 17/214* (2013.01); *G06F 21/10* (2013.01)

(58) Field of Classification Search
CPC .................................................... G06F 17/214
See application file for complete search history.

(56) References Cited

U.S. PATENT DOCUMENTS

| | | | | |
|---|---|---|---|---|
| 6,043,826 A | * | 3/2000 | Manning | G06F 17/214 345/467 |
| 2002/0010725 A1 | * | 1/2002 | Mo | G06F 17/214 715/205 |
| 2002/0194261 A1 | * | 12/2002 | Teshima | G06F 17/214 709/203 |
| 2005/0024389 A1 | * | 2/2005 | Mairs | G06T 9/005 345/672 |
| 2005/0080839 A1 | * | 4/2005 | Kuwata | G06F 17/214 709/200 |
| 2012/0001921 A1 | * | 1/2012 | Escher | G06F 17/214 345/467 |
| 2012/0206751 A1 | * | 8/2012 | Bradshaw | G06F 3/1208 358/1.13 |
| 2015/0348278 A1 | * | 12/2015 | Cavedoni | G06F 17/214 345/467 |

* cited by examiner

Primary Examiner — Keith D Bloomquist
(74) Attorney, Agent, or Firm — Kilpatrick Townsend & Stockton LLP

(57) ABSTRACT

In various aspects, systems and methods according to certain embodiments do not require that fonts be available on each user's system. An on-demand font service provides any required font data to the client. Accordingly, no matter what client device, a document rendered with font data provided by the service will look the same across all platforms even if a substituted font is used.

17 Claims, 7 Drawing Sheets

SYSTEM INDEPENDENT FONT RENDERING

BACKGROUND OF THE INVENTION

The web revolution has brought many advantages, but has introduced several problems, including those pertaining to font rendering. Developers usually cannot change which browser and OS a website visitors uses. Until recently, there were only a small handful of "Web safe" fonts we could use. While offering little variety (or means of expression), these fonts were very well-crafted and specifically adjusted—or even developed—for the screen, so there was little to worry about in terms of display quality.

However, when rendering documents across various computers, the fidelity of the rendered document is largely based on the fonts available on the users system. If the original font used in the document is not available on the user system, then currently the industry tries to find a substitution font to take the place of the original font. This often causes the document to render differently than the creator of the document intended. In addition, because the fonts available on users systems vary from user to user, viewing the document on one user's machine may look different than viewing it on another user's machine.

Having a great choice of fonts that can be used on websites and in other documents makes the developers job difficult. Additionally, operating system (OS) makers may apply different strategies to render how typefaces are displayed. The rendering of these glyphs can differ significantly between systems and font formats. Even well designed fonts may not look right on a user's system.

Accordingly, what is desired are improved methods and apparatus for solving some of the problems discussed above. Additionally, what is desired are improved methods and apparatus for reducing some of the drawbacks discussed above.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

In various aspects, systems and methods according to certain embodiments do not require that fonts be available on each user's system. An on-demand font service provides any required font data to the client. Accordingly, no matter what client device, a document rendered with font data provided by the service will look the same across all platforms even if a substituted font is used.

In one embodiment, a method for generating a document includes receiving, at one or more computer systems, a request to render a portion of text, the portion of text being associated with one or more rendering calls to render text in at least one font. A font is then selected based on the request. A fixed format is generated representing the portion of the text rendered in the selected font. A set of instructions to a client is also generated based on the fixed format. The set of instructions are sent to the client causing the client to include at least a portion of the fixed format in the document.

In one aspect, generating the fixed format representing the portion of the text rendered in the selected font may include generating one or more raster images each representative of at least one character in the portion of text. In another aspect, generating the fixed format representing the portion of the text rendered in the selected font may include generating a bitmap image representative the portion of text.

In certain embodiments, selecting the font based on the request includes selecting the font based on the one or more rendering calls to render text in at least one font. Selecting the font based on the request may include selecting the font based a first font determined to substitute for a second font. The set of instructions and the fixed format may be packaged into a response to the request to render the portion of text. The request to render the portion of text may include receiving the request in response to an agent parsing a document to identify one or more rendering calls in the document.

In one embodiment, a non-transitory computer-readable medium storing a computer program product which when executed by one or more processors of one or more computer systems causes the one or more processors to receive a request to render a portion of text, the portion of text being associated with one or more rendering calls to render text in at least one font; select a font based on the request; generate a fixed format representing the portion of the text rendered in the selected font; generate a set of instructions to a client based on the fixed format; and send the set of instructions to the client causing the client to include at least a portion of the fixed format in a document.

In further embodiments, a method for generated a document at a client device includes receiving a first document. The first document is parsed to identify one or more rendering calls to render a portion of text in at least one font. A request to a font source is then generated based on the one or more rendering calls. The request is sent to the font source. A set of instructions generated by the font source are received and a second document is generated based on the set of instructions, the second document having a fixed format representative of the block of text.

Generating the request to the font source based on the one or more rendering calls may include crafting a request using the portion of text. Receiving the set of instructions generated by the font source may include receiving one or more raster images generated by the font source each representative of at least one character in the portion of text. Receiving the set of instructions generated by the font source may include receiving one or more raster images generated by the font source each representative of at least one character in the portion of text. Generating the second document based on the set of instructions may include inserting the fixed format representative of the block of text into the first document.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION OF THE INVENTION

Figure 1:
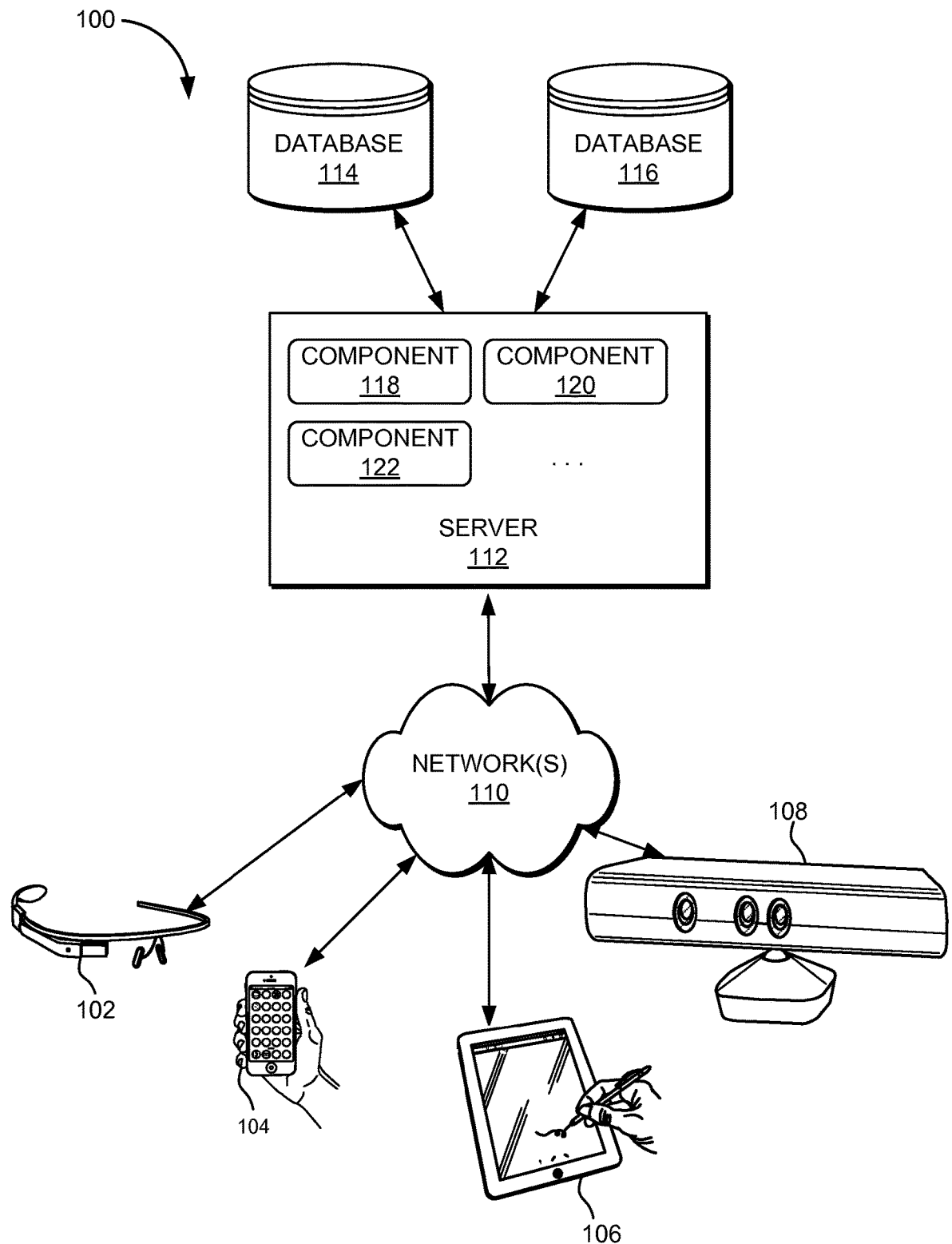
FIG. 1 depicts a simplified diagram of a distributed system for implementing one of the embodiments.

In the following description, for the purposes of explanation, specific details are set forth in order to provide a thorough understanding of embodiments of the invention. However, it will be apparent that various embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments. The figures and description are not intended to be restrictive. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" or "computer-readable medium" includes, but is not limited to, portable or non-portable storage devices, optical storage devices, wireless channels, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable or computer-readable medium. One or more processors may perform the necessary tasks.

Systems depicted in some of the figures may be provided in various configurations. In some embodiments, the systems may be configured as a distributed system where one or more components of the system are distributed across one or more networks in a cloud computing system. In further embodiments, the systems may be configured as a single system where one or more components of the system incorporated into a single structure or package.

Introduction

FIG. 1 depicts a simplified diagram of distributed system 100 for implementing one of the embodiments. In the illustrated embodiment, distributed system 100 includes one or more client computing devices 102, 104, 106, and 108, which are configured to execute and operate a client application such as a web browser, proprietary client (e.g., Oracle Forms), or the like over one or more network(s) 110. Server 112 may be communicatively coupled with remote client computing devices 102, 104, 106, and 108 via network 110.

In various embodiments, server 112 may be adapted to run one or more services or software applications provided by one or more of the components of the system. In some embodiments, these services may be offered as web-based or cloud services or under a Software as a Service (SaaS) model or a Platform as a Serves (PaaS) model to the users of client computing devices 102, 104, 106, and/or 108. Users operating client computing devices 102, 104, 106, and/or 108 may in turn utilize one or more client applications to interact with server 112 to utilize the services provided by these components.

In the configuration depicted in FIG. 1, software components 118, 120, and 122 of system 100 are shown as being implemented on server 112. In other embodiments, one or more of the components of system 100 and/or the services provided by these components may also be implemented by one or more of the client computing devices 102, 104, 106, and/or 108. Users operating the client computing devices may then utilize one or more client applications to use the services provided by these components. These components may be implemented in hardware, firmware, software, or combinations thereof. It should be appreciated that various different system configurations are possible, which may be different from distributed system 100. The embodiment shown in the figure is thus one example of a distributed system for implementing an embodiment system and is not intended to be limiting.

Client computing devices 102, 104, 106, and/or 108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. Client computing devices 102, 104, 106, and/or 108 can be general purpose personal computers including, by way of example, personal computers and/or laptop computers running various versions of Microsoft Windows®, Apple Macintosh®, and/or Linux operating systems. Client computing devices 102, 104, 106, and/or 108 can be workstation computers running any of a variety of commercially-available UNIX® or UNIX-like operating systems, including without limitation the variety of GNU/Linux operating systems, such as for example, Google Chrome OS. Alternatively, or in addition, client computing devices 102, 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary distributed system 100 is shown with four client computing devices, any number of client computing devices may be supported. Other devices, such as devices with sensors, etc., may interact with server 112.

Network(s) 110 in distributed system 100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 112 may be composed of one or more general purpose computers, specialized server computers (including, by way of example, PC (personal computer) servers, UNIXO servers, mid-range servers, mainframe computers, rack-mounted servers, etc.), server farms, server clusters, or any other appropriate arrangement and/or combination. In various embodiments, server 112 may be adapted to run one or more services or software applications described in the foregoing disclosure. For example, server 112 may correspond to a server for performing processing described above according to an embodiment of the present disclosure.

Server 112 may run an operating system including any of those discussed above, as well as any commercially available server operating system. Server 112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 112 may include one or more applications to analyze and consolidate data feeds and/or event updates received from users of client computing devices 102, 104, 106, and 108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 112 may also include one or more applications to display the data feeds and/or real-time events via one or more display devices of client computing devices 102, 104, 106, and 108.

Distributed system 100 may also include one or more databases 114 and 116. Databases 114 and 116 may reside in a variety of locations. By way of example, one or more of databases 114 and 116 may reside on a non-transitory storage medium local to (and/or resident in) server 112. Alternatively, databases 114 and 116 may be remote from server 112 and in communication with server 112 via a network-based or dedicated connection. In one set of embodiments, databases 114 and 116 may reside in a storage-area network (SAN). Similarly, any necessary files for performing the functions attributed to server 112 may be stored locally on server 112 and/or remotely, as appropriate. In one set of embodiments, databases 114 and 116 may include relational databases, such as databases provided by Oracle, that are adapted to store, update, and retrieve data in response to SQL-formatted commands.

System Independent Font Rendering

In various aspects, systems and methods according to certain embodiments do not require that fonts be available on each user's system. Thus, a font substitution process is no longer needed in order to render a document. In certain embodiments, an on-demand font service provides any required font data to the client. In various embodiments, the service stores more font data that in most cases far exceeds the number of fonts available on client devices. Thus, in most cases, the need for font substitution is eliminated altogether. Moreover, the chances are greatly reduced that a substitution font will be needed. Accordingly, no matter what client device, a document rendered with font data provided by the service will look the same across all platforms even if a substituted font is used.

Figure 2:
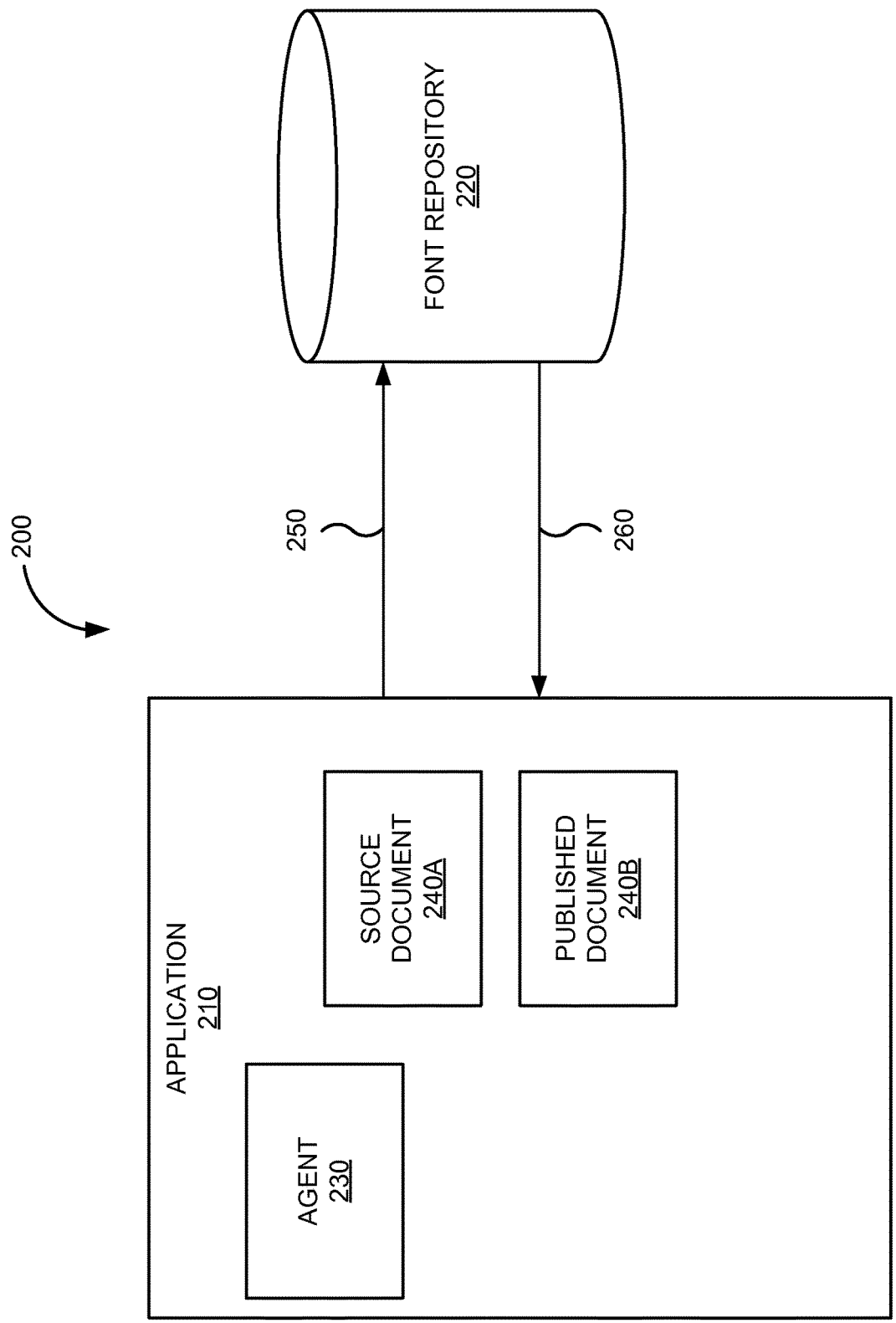
FIG. 2 is a block diagram of a font system according to one embodiment that may be used to generate system independent documents.

FIG. 2 is a block diagram of font system 200 according to one embodiment. FIG. 2 may merely be illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures.

In this example, font system 200 includes application 210 in communication with font repository 220. Application 210 includes a set of one or more programs designed to carry out operations with respect to documents. Application 210 may be executed on or otherwise hosted by a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

As used herein, a document can include e-mail messages, instant messages, text messages, and/or collaborative messages (e.g., blogs, threads, forums, wiki comments), web pages, application user interface pages, word processor documents, spreadsheet documents, image files, multimedia files, or the like. The document may be received from a locally accessible data store or from a remote server. In general, the document includes at least text to be rendered in an intended font.

Font repository 220 includes hardware and/or software elements that receive text to be rendered in an intended font and provide a set of rendering instructions for rendering the text in the intended font. Rendering instructions can include instructions on how to display document text in its corresponding font without having application 210 download or otherwise retrieve the intended font. In certain embodiments, the rendering instructions from the font source include rasterization data. Generally, in digital type, characters are designed as abstract drawings. When text is displayed on screen, the ideal shape of each character is expressed with a grid of pixels. One or more sophisticated rendering methods can be used to make rendered text appear closer to the ideal shape. In one embodiment, the font source rasterizes all or part of the block of text included in the render request using black and white or bi-level rendering. In certain embodiments, the font source rasterizes all or part of the block of text included in the render request using grayscale rendering. In grayscale rendering, a pixel that is on the border of the original shape becomes gray; its brightness depending on how much it is covered by the ideal black shape. As a result, the contour appears much smoother, and design details are represented. In further embodiments, the font source rasterizes all or part of the block of text included in the render request using sub pixel rendering.

In one aspect, a user of application 210 may desire to create a system-independent version of source document 240A. A system-independent version is viewable on any system in the same consistent manner irrespective of whether any fonts used to create document 240A are available on the system. Document 240A can include text information, image information, audio-visual information, multimedia information, or the like. Application 210 employs agent 230 to parse source document 240A. Agent 230 can detect one or more font rendering calls associated with a block of text information. Agent 230 generates and sends request 250 to font repository 220 to render the block of text according to the intended font associated with the rendering calls. Request 250 can include all or part of the block of text and a set of instructions, commands, or hints used by the font repository 220 to render text.

Font repository 220 receives request 250 and generates response 260. Response 260 can include instructions on how to display the block of test in its corresponding font without needing the intended font to be available. In certain embodiments, the rendering instructions include rasterization data generated by font repository 220 based on the block of text. Generally, in digital type, characters are designed as abstract drawings. When text is displayed on screen, the ideal shape of each character is expressed with a grid of pixels. One or more sophisticated rendering methods can be used to make rendered text appear closer to the ideal shape. In one embodiment, the font source rasterizes all or part of the block of text included in the render request using black and white or bi-level rendering. In certain embodiments, the font source rasterizes all or part of the block of text included in the render request using grayscale rendering. In grayscale rendering, a pixel that is on the border of the original shape becomes gray; its brightness depending on how much it is covered by the ideal black shape. As a result, the contour appears much smoother, and design details are represented. In further embodiments, the font source rasterizes all or part of the block of text included in the render request using sub pixel rendering.

Font repository 220 may render the block of text according to the intended font by converting a vector description to a raster or bitmap description representing the rendered text. In certain embodiments, font repository 220 may render the block of text according to a substitution font. Font repository 220 sends response 260 to agent 230 of application 210.

Agent 230 creates published document 240B using instructions received from font repository 220. For example, agent 230 may include portions of document 240A and rasterization data received from font repository 220 to generate published document 240B. Published document 240B does not require that fonts be available on each user's system. Thus, a font substitution process is no longer needed in order to render document 240B. Accordingly, no matter what client device, document 240B rendered with font data provided by font repository 220 will look the same across all platforms.

Figure 3:
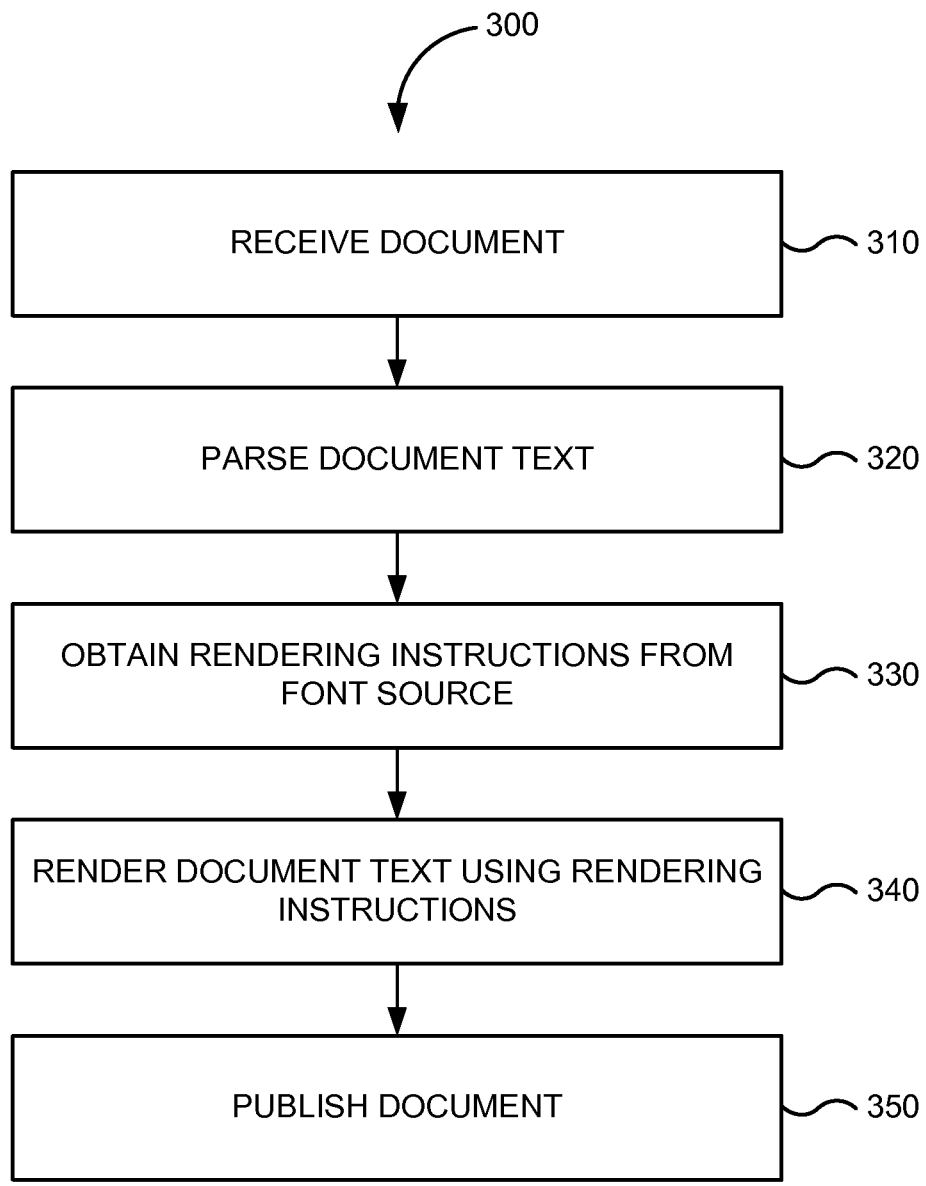
FIG. 3 is a flow diagram illustrating a method for creating system independent documents according to one embodiment.

FIG. 3 is a flow diagram illustrating method 300 for creating system independent documents according to one embodiment. Implementations of or processing in method 300 depicted in FIG. 3 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 300 depicted in FIG. 3 begins in step 310.

In step 310, a document is received at a client device. In step 320, text of the document is parsed. In certain embodiments, the document text is parsed and analyzed to identify one or more rendering calls. A rendering call is a function call (e.g., using an API) to a font renderer. Every rendering call to a font renderer can usually be associated to a single font. In certain embodiments, the rendering call may include a link or reference to a font source.

In step 330, rendering instructions are obtained from a font source. The client device may generate a request instructing the font source to render a block of text in an intended font. The block of text may be rendered by the font source to generate rasterization information that includes a raster or bitmap image. The rasterization information can be returned to the client device in the form on instructions on how to render the block of text.

In step 340, the document text is rendered using the rendering instructions. When the intended font is not on the client device or otherwise available, the client device processes the rending instructions to extract the rasterization data. The rasterization data may correspond to a set of images that represent a block of text in the intended font. In step 350, the document is published or otherwise saved. The document can be displayed and viewed on a variety of systems without needing to process any further rendering calls or substituting for any fonts.

Figure 4:
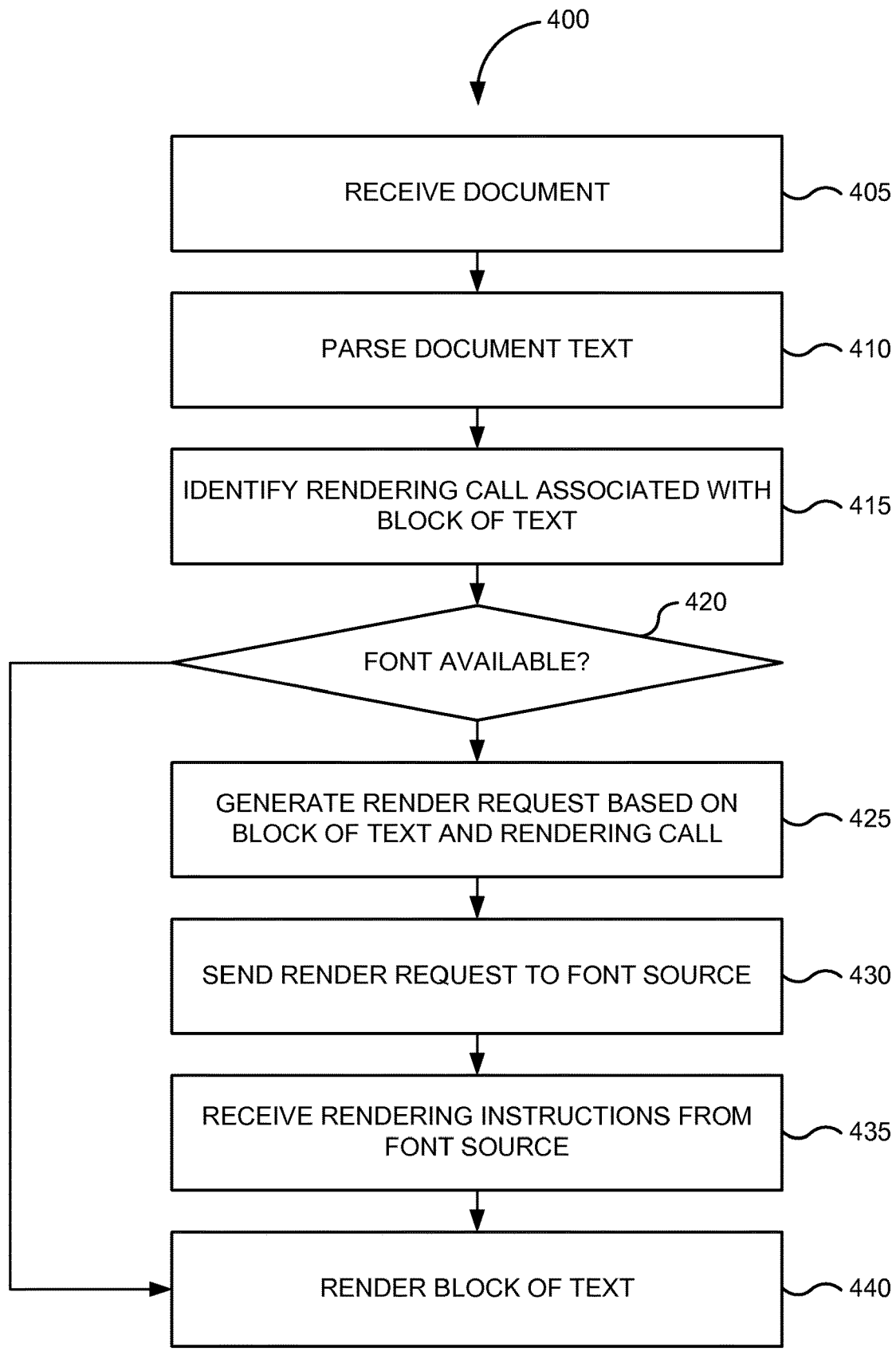
FIG. 4 is a flow diagram illustrating a method of a client device interacting with a font source according to one embodiment.

FIG. 4 is a flow diagram illustrating method 400 of a client device interacting with a font source according to one embodiment. Implementations of or processing in method 400 depicted in FIG. 4 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 400 depicted in FIG. 4 begins in step 405.

In step 405, a document is received at a client device. In step 410, text of the document is parsed. As discussed above, the document text may be analyzed to identify one or more rendering calls. In step 415, a rendering call associated with a block of text is identified.

In step 420, a determination is made whether the font associated with the identified rendering call is available. For example, the client device may check a list of system or application-specific fonts for a corresponding font to use. If the determination is made that the font associated with the identified rendering call is available, the block of text is rendered in step 440.

If the determination is made in step 420 that the font associated with the identified rendering call is not available, a render request is generated based on the block of text and the rendering call in step 425. The render request may include one or more instructions to have the font source render, rasterize, or otherwise convert all or part of the block of text using a corresponding font into a fixed format. In certain embodiments, the render request may include one or more preferred font substitutes if the corresponding font is not available on a font source. In some embodiments, the render request may include a security key for accessing a font source. In another embodiment, the render request may include a username and password for accessing a font source. In yet another embodiment, the render request may include information about the calling application, the client device, the user of the client device, or the like.

Accordingly, if the intended font is not on the client device or otherwise available, the client device can obtain rendering instructions from a font source. In step 430, the rendering request is sent to the font source. In step 435, rendering instructions are received from the font source. Rendering instructions can include instructions on how to display the block of text in the corresponding font on client device without downloading the intended font. The rendering instructions may include the fixed format resulting from the font source have rendering, rasterizing, or otherwise converting all or part of the forwarded block of text using the intended font. The rendering instructions may include the fixed format resulting from the font source have rendering, rasterizing, or otherwise converting all or part of the forwarded block of text using a substitution or preferred font.

In step 440, the block of text is rendered. When the intended font is not on the client device or otherwise available, the client device processes the rending instructions to extract the rasterization data to include in the document all or part of the block of text as rendered the intended font. The document can be displayed and viewed on a variety of systems without needing to process any further rendering calls or substituting for any fonts.

Figure 5:
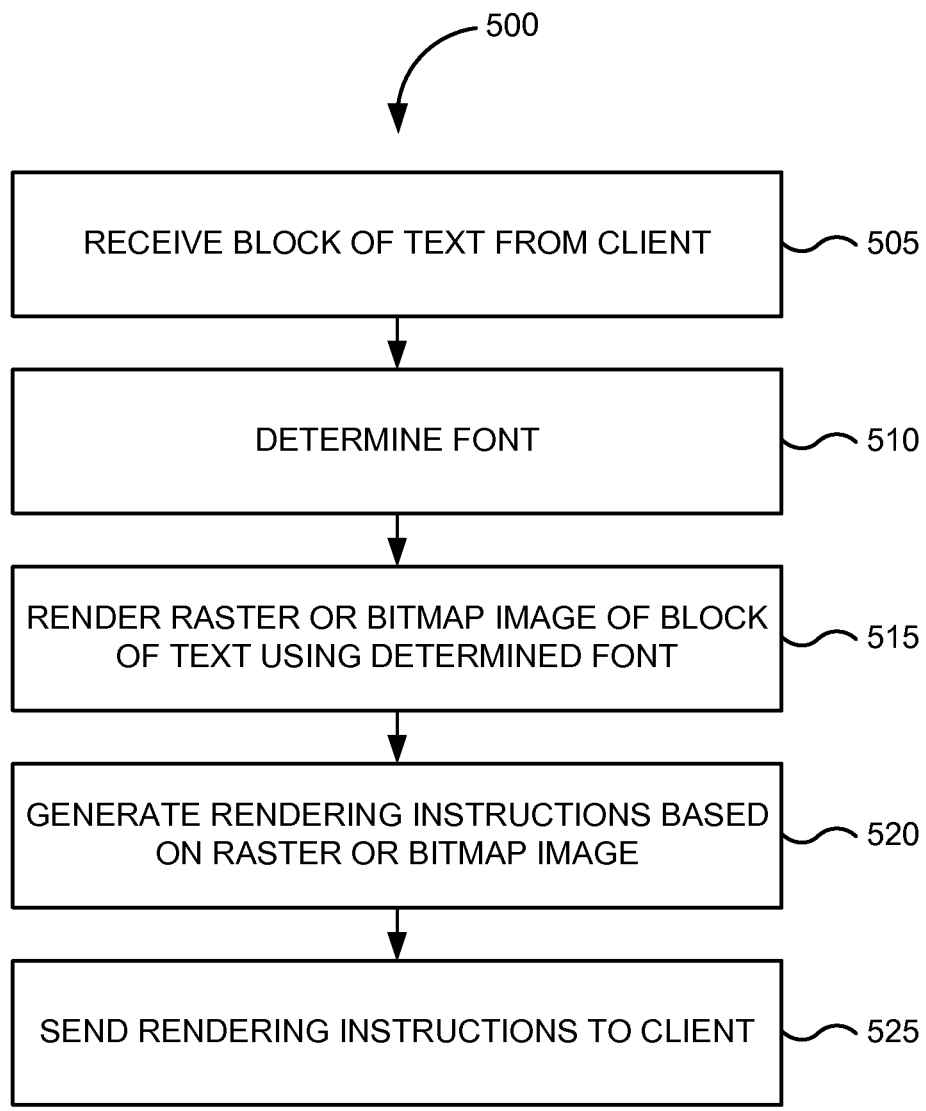
FIG. 5 is a flow diagram illustrating a method of a font source interacting with a client device according to one embodiment.

FIG. 5 is a flow diagram illustrating method 500 of a font source interacting with a client device according to one embodiment. Implementations of or processing in method 500 depicted in FIG. 5 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 500 depicted in FIG. 5 begins in step 505.

In step 505, a block of text is received at a font source (e.g., font repository 220). In certain embodiments, the block of text is accompanied by a set of instructions, commands, or hint that allow the font source to determine an intended or designated font. In step 510, the font source determines a font to use to render the block of text. As discussed above, the font source may include a larger number of and a wider variety of fonts than the client device. For example, the font source may check a list of system or application-specific fonts for a corresponding font to use. The font source can determine the intended font directly as specified in a request from the client device or indirectly using one or more hints. Additionally, the font source may determine one or more substitution or preferred fonts to be used to render the block of text. An administrator may establish one or more rules or policies that manage the determination of the font.

In step 515, a raster or bitmap image of the block of text is rendered using the determined font. The raster or bitmap image may be generated using a variety of anti-aliasing or sub-pixel techniques as known in the art. In some embodiments, different versions or resolutions of the raster or bitmap image may be generated based on criteria associated with how a resulting document is to be used (e.g., the type of screen on which the document will be viewed, the type of device, etc.).

In step 520, a set of rendering instructions are generated based on the raster or bitmap image. As alluded to above, the rendering instructions can include information that allows the client device or client application to include the raster or bitmap image in the resulting document. In step 525, the set of rendering instructions are sent to the client device.

CONCLUSION

Figure 6:
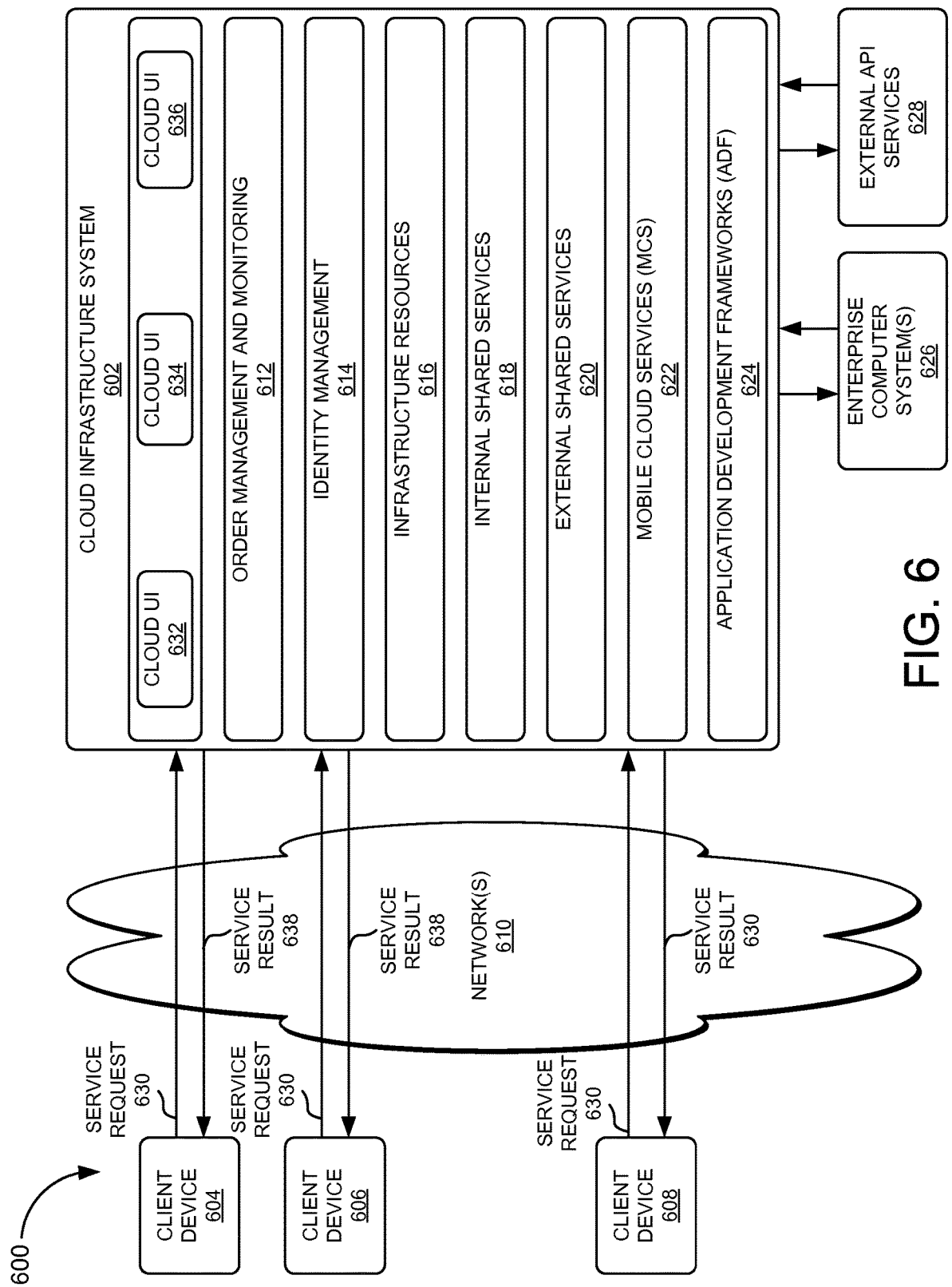
FIG. 6 is a simplified block diagram of components of a system environment by which services provided by the components of an embodiment system may be offered as mobile cloud services, in accordance with an embodiment of the present disclosure.

FIG. 6 is a simplified block diagram of one or more components of system environment 600 by which services provided by one or more components of an embodiment system may be offered as cloud services, in accordance with an embodiment of the present disclosure. In the illustrated embodiment, system environment 600 includes cloud infrastructure system 602 that provides cloud services to one or more client computing devices 604, 606, and 608. Client computing devices 604, 606, and 608 may be used by users to interact with cloud infrastructure system 602. Client computing devices 604, 606, and 608 may be configured to operate a client application such as a web browser, a proprietary client application (e.g., Oracle Forms), or some other application, which may be used by a user of the client computing device to interact with cloud infrastructure system 602 to use services provided by cloud infrastructure system 602.

It should be appreciated that cloud infrastructure system 602 depicted in FIG. 6 may have other components than those depicted. Further, the embodiment shown in FIG. 6 is only one example of a cloud infrastructure system that may incorporate an embodiment of the invention. In some other embodiments, cloud infrastructure system 602 may have more or fewer components than shown in FIG. 6, may combine two or more components, or may have a different configuration or arrangement of components.

Client computing devices 604, 606, and 608 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. Client computing devices 604, 606, and 608 can be general purpose personal computers including, by way of example, personal computers and/or laptop computers running various versions of Microsoft Windows®, Apple Macintosh®, and/or Linux operating systems. Client computing devices 604, 606, and 608 can be workstation computers running any of a variety of commercially-available UNIX® or UNIX-like operating systems, including without limitation the variety of GNU/Linux operating systems, such as for example, Google Chrome OS. Alternatively, or in addition, Client computing devices 604, 606, and 608 may be any other electronic device, such as a thin-client computer, an Internet-enabled gaming system (e.g., a Microsoft Xbox gaming console with or without a Kinect® gesture input device), and/or a personal messaging device, capable of communicating over network(s) 610.

Although exemplary system environment 600 is shown with three client computing devices, any number of client computing devices may be supported. Other devices such as devices with sensors, etc. may interact with cloud infrastructure system 602.

Network(s) 610 may facilitate communications and exchange of data between clients 604, 606, and 608 and cloud infrastructure system 602. Network(s) 610 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 610 can be a local area network (LAN), such as one based on Ethernet, Token-Ring and/or the like. Network(s) 610 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Cloud infrastructure system 602 may comprise one or more computers and/or servers. These computer systems or servers may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, one or more computer systems or servers associated with cloud infrastructure system 602 may be adapted to run one or more services or software applications described in the foregoing disclosure. For example, one or more computer systems or servers associated with cloud infrastructure system 602 may correspond to a server for performing processing described herein according to an embodiment of the present disclosure.

One or more computer systems or servers associated with cloud infrastructure system 602 may run an operating system including any of those discussed above, as well as any commercially available server operating system. One or more computer systems or servers associated with cloud infrastructure system 602 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In certain embodiments, services provided by cloud infrastructure system 602 may include a host of services that are made available to users of cloud infrastructure system 602 on demand, such as online data storage and backup solutions, Web-based e-mail services, hosted office suites and document collaboration services, database processing, managed technical support services, and the like. Services provided by cloud infrastructure system 602 can dynamically scale to meet the needs of its users. A specific instantiation of a service provided by cloud infrastructure system 602 is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service instance instantiated by cloud infrastructure 602 may include protected computer network access to storage, a hosted database, a hosted web server, a software application, or other service provided by a cloud vendor to a user, or as otherwise known in the art. For example, a service instance instantiated by cloud infrastructure 602 can include password-protected access to remote storage on the cloud through the Internet. As another example, a service instance instantiated by cloud infrastructure 602 can include a web service-based hosted relational database and a script-language middleware engine for private use by a networked developer. As another example, a service instance instantiated by cloud infrastructure 602 can include access to an email software application hosted on a cloud vendor's web site.

In certain embodiments, cloud infrastructure system 602 may include a suite of applications, middleware, development service, and database service offerings that are delivered to a customer in a self-service, subscription-based, elastically scalable, reliable, highly available, and secure manner. An example of such a cloud infrastructure system as embodied in cloud infrastructure service 602 is the Oracle Public Cloud provided by the present assignee.

Cloud infrastructure system 602 may provide the cloud services via different deployment models. For example, services may be provided under a public cloud model in which cloud infrastructure system 602 is owned by an organization selling cloud services (e.g., owned by Oracle) and the services are made available to the general public or different industry enterprises. As another example, services may be provided under a private cloud model in which cloud infrastructure system 602 is operated solely for a single organization and may provide services for one or more entities within the organization. The cloud services may also be provided under a community cloud model in which cloud infrastructure system 602 and the services provided by cloud infrastructure system 602 are shared by several organizations in a related community. The cloud services may also be provided under a hybrid cloud model, which is a combination of two or more different models.

In some embodiments, the services provided by cloud infrastructure system 602 may include one or more services provided under Software as a Service (SaaS) category, Platform as a Service (PaaS) category, Infrastructure as a Service (IaaS) category, or other categories of services including hybrid services. In some embodiments, the services provided by cloud infrastructure system 602 may include, without limitation, application services, platform services and infrastructure services. In some examples, application services may be provided by cloud infrastructure system 602 via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 602 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 602 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by cloud infrastructure system 602 and also control the deployed services. In some embodiments, platform services provided by cloud infrastructure system 602 may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in cloud infrastructure system 602. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 602, and the like. In various embodiments, cloud infrastructure system 602 may be adapted to automatically provision, manage and track a customer's subscription to services offered by cloud infrastructure system 602. A customer, via a subscription order, may order one or more services provided by cloud infrastructure system 602. Cloud infrastructure system 602 then performs processing to provide the services in the customer's subscription order.

In one embodiment, as depicted in FIG. 6, cloud management functionality may be provided by one or more modules, such as order management and monitoring module 614. These modules may include or be provided using one or more computers and/or servers, which may be general purpose computers, specialized server computers, server farms, server clusters, or any other appropriate arrangement and/or combination.

In exemplary operation, a customer using a client device, such as one or more of client computing devices 604, 606 or 608, may interact with cloud infrastructure system 602 by requesting one or more services provided by cloud infrastructure system 602. The customer may issue service request 634 cloud infrastructure system 602 using a variety of means. Service request 634 may include placing an order for a subscription for one or more services offered by cloud infrastructure system 602, accessing one or more services offered by cloud infrastructure system 602, or the like. In certain embodiments, the customer may access a cloud User Interface (UI), cloud UI 632, cloud UI 634 and/or cloud UI 638 and place a subscription order via these UIs. The order information received by cloud infrastructure system 602 in response to the customer placing an order may include information identifying the customer and information identifying one or more services offered by the cloud infrastructure system 602 to which the customer intends to subscribe. After an order has been placed by the customer, the order information is received via the cloud UIs, 632, 634 and/or 638.

In this example, order management and monitoring module 614 sends information received from a customer to an order database to have the order placed by the customer stored in recorded. The order database can be one of several databases operated by cloud infrastructure system 602 and operated in conjunction with other system elements. Order management and monitoring module 614 may forward information that includes all or part of the order information stored in the order database to an order management module. In some instances, the order management module may be configured to perform billing and accounting functions related to the order, such as verifying the order, and upon verification, booking the order.

Order management and monitoring module 614 may communicate all or part of the order information to an order orchestration module that utilizes the order information to orchestrate the provisioning of services and resources for the order placed by the customer. In some instances, the order orchestration module may orchestrate the provisioning of resources to support the subscribed services using the services of an order provisioning module.

In certain embodiments, the order orchestration module enables the management of business processes associated with each order and applies business logic to determine whether an order should proceed to provisioning. Upon receiving an order for a new subscription, the order orchestration module sends a request to the order provisioning module to allocate resources and configure those resources needed to fulfill the subscription order. The order provisioning module enables the allocation of resources for the services ordered by the customer. The order provisioning module provides a level of abstraction between the cloud services provided by cloud infrastructure system 602 and the physical implementation layer that is used to provision the resources for providing the requested services. The order orchestration module may thus be isolated from implementation details, such as whether or not services and resources are actually provisioned on the fly or pre-provisioned and only allocated/assigned upon request.

In certain embodiments, order management and monitoring module 614 manages and tracks a customer's subscription order. In some instances, order management and monitoring module 614 may receive information indicative of any provisioned services and/or resources associated with the customer. Order management and monitoring module 614 may be configured to collect usage statistics for the services in the subscription order, such as the amount of storage used, the amount data transferred, the number of users, and the amount of system up time and system down time.

Once services and resources are provisioned in the above example, service result 638 may be sent to customers on client computing devices 604, 606, and/or 608 informing the customer of the provided services and/or resources. In instances where service request 630 includes a request to access a service or have a service perform one or more operations, service result 638 may be send to customers on client computing devices 604, 606, and/or 608 providing the requested access or results of any operations, services performed, or data requested.

In certain embodiments, cloud infrastructure system 600 may include identity management module 614. Identity management module 614 may be configured to provide identity services, such as access management and authorization services in cloud infrastructure system 602. In some embodiments, identity management module 614 may control information about customers who wish to utilize the services provided by cloud infrastructure system 602. Such information can include information that authenticates the identities of such customers and information that describes which actions those customers are authorized to perform relative to various system resources (e.g., files, directories, applications, communication ports, memory segments, etc.) Identity management module 614 may also include the management of descriptive information about each customer and about how and by whom that descriptive information can be accessed and modified.

In certain embodiments, cloud infrastructure system 602 may also include infrastructure resources 616 for providing the resources used to provide various services to customers of cloud infrastructure system 602. In one embodiment, infrastructure resources 616 may include pre-integrated and optimized combinations of hardware, such as servers, storage, and networking resources to execute the services provided by the PaaS platform and the SaaS platform.

In some embodiments, resources in cloud infrastructure system 602 may be shared by multiple users and dynamically re-allocated per demand. Additionally, resources may be allocated to users in different time zones. For example, cloud infrastructure system 602 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 618 may be provided that are shared by different components or modules of cloud infrastructure system 602 and by the services provided by cloud infrastructure system 602. These internal shared services 618 may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, a number of external shared services 620 may be provided that are shared by different components or modules of cloud infrastructure system 602 and by the services provided by cloud infrastructure system 602. These external shared services 620 may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In various embodiments, external shared services 620 may include one or more components that provide access, data transformation, automation, or the like to enterprise computer system(s) 626. Access to enterprise computer system(s) 626 may be shared by different components or modules of cloud infrastructure system 602 and by the services provided by cloud infrastructure system 602. In some embodiments, access to enterprise computer system(s) 626 may be shared by service instances provided by cloud infrastructure system 602 that are restricted to one or more subscribers.

In further embodiments, external shared services 620 may include external application programming interface (API) services 628 that are shared by different components or modules of cloud infrastructure system 602 and by the services provided by cloud infrastructure system 602. These external API services 628 may include, without limitation, APIs provided by other third party services or entities.

Various different mobile cloud services may be provided by mobile cloud service (MSC) 622 in cloud infrastructure system 602. MCS 622 facilitates communication between a mobile computing device and enterprise computer systems (e.g., enterprise computer systems 624 and 626) according to some embodiments of the present invention. MCS 622 may include one or more memory storage devices ("local storage") used to store enterprise data and authentication information. Enterprise data may be received from enterprise computer systems 626 or from client computing devices 604, 606, or 608 or may include enterprise data converted by cloud infrastructure system 602, or combinations thereof. Authentication information may be received from identity management system 616 and/or generated by cloud infrastructure system 602. In some embodiments, authentication information may include information indicating security authentication of a user with regard to a request for a service.

Enterprise computer systems, such as enterprise computer systems 626 may be physically located beyond a firewall of cloud infrastructure system 602 at a different geographic location (e.g., remote geographic location) than cloud infrastructure system 602. In some embodiments, enterprise computer systems 626 may include one or more different computers or servers. In some embodiments, enterprise computer systems 626 may be part of a single computer system.

In certain embodiments, enterprise computer systems 626 may communicate with cloud infrastructure system 602 using one or more different protocols. Each of enterprise computer systems 626 may communicate with cloud infrastructure system 602 using a different communication protocols. Enterprise computer systems 626 may support the same or different security protocols. In some embodiments, MSC 6112 may include an agent system to handle communication with enterprise computer systems 626.

A protocol may include a communication protocol, such as SPDY. A protocol may include an application protocol such as an HTTP-based protocol. In some embodiments, enterprise computer systems 626 may communicate with cloud infrastructure system 602 using a REST or SOAP communication protocols. For example, REST protocol may support a formats including URI or URL. Enterprise Data formatted for communication using REST protocol may be easily converted to data formats such as JSON, comma-separated values (CSV), and really simple syndication (RSS). Enterprise computer systems 626 and cloud infrastructure system 602 may communicate using other protocols such as remote procedure calls (RPC) (e.g., XML RPC).

In some embodiments, MCS 622 may include an adaptor interface configured to support communication with one or more services provided by cloud infrastructure service 602, some of which may support different protocols or techniques for communications. In some embodiments, MCS 622 may include an adaptor interface configured to support communication with enterprise computer systems 626, some of which may support different protocols or techniques for communications. MCS 622 may include one or more adaptors each of which may be configured to communicate according to a communication protocol, a type of enterprise computer system, a type of application, a type of service, or combinations thereof. A communication protocol supported by an adaptor may be specific to a service or one or more of enterprise computer systems 626.

In certain embodiments, client computing devices 604, 606, and 608 may each implement an application that can provide specific user interfaces to communicate with MCS 622. A specific UI may be configured to communicate using a specific communication protocol. In some embodiments, specific UIs may include callable interfaces, functions, routines, methods, and/or operations that may be invoked to communicate with MCS 622. Specific UIs may accept as input parameters for communicating with a service provided by cloud infrastructure service 602 or with enterprise computer systems 626 for enterprise data and/or to request a service. In some embodiments, communication through MCS 622 may be converted for communication using a custom communication protocol. In some embodiments, specific UIs may correspond to a custom client in an application.

MCS 622 may include one or more callable interfaces, e.g., an application programming interface (API). Callable interfaces associated with MCS 622 may enable an app on a mobile computing device to communicate requests to MCS 622. Callable interfaces associated with MCS 622 may support a common or standard interface, which may allow requests including their parameters to be received from apps according to a standardized protocol, architectural style, and/or format (e.g., a REST protocol). Callable interfaces associated with MCS 622 may be configurable by a user of any one of computing devices 604, 606, or 608. Callable interfaces associated with MCS 622 may receive requests for services according to a communication protocol. Device application developers can connect to MCS 622 for their custom applications. In some embodiments, a callable interface associated with MCS 622 may be configured by the same person that develops an app, such that the person can implement a custom app to communicate with MCS 622.

Callable interfaces associated with MCS 622 may further enable enterprise computer systems 626 to communicate with MCS 622 according to a standardized protocol or format. Similar to application developers, those who manage enterprise computer systems can implement code (e.g., an agent system) that is configured to communicate with MCS 622 via one or more callable interfaces. Callable interfaces associated with MCS 622 may be implemented based on a type of a computing device, a type of enterprise computer systems, an app, an agent system, a service, a protocol, or other criterion. In some embodiments, callable interfaces associated with MCS 622 may support requests for services including authentication, compression, encryption, pagination with cursors, client-based throttling, non-repudiation, logging, and metrics collection. In some embodiments, callable interfaces associated with MCS 622 may be implemented for custom business-related services, such as authentication, policy enforcement, caching of responses, throttling of calls to MCS 622, translation between asynchronous and synchronous patterns, logging of calls to underlying services, or combinations thereof. In some embodiments, callable interfaces associated with MCS 622 may enable users to load custom code for implementation by cloud infrastructure system 602. The custom code may implement one or more callable interfaces associated with MCS 622 for cloud infrastructure system 602, which can enable users to access custom services or other enterprise computer systems.

Protocol translators associated with MCS 622 may process a message to determine a communication protocol for a message and/or to convert a message to a communication protocol for a destination. Protocol translators associated with MCS 622 may convert a request received from client computing devices 604, 606, or 608. The request may be converted from a format of a communication protocol supported by client computing devices 604, 606, or 608 to a format of a communication protocol supported by a service provided by cloud infrastructure service 602 or enterprise computer systems 626. Protocol translators associated with MCS 622 may convert a response received from a service provided by cloud infrastructure service 602 or enterprise computer systems 626. A response may be converted from a format of a communication protocol supported by a service provided by cloud infrastructure service 602 or enterprise computer systems 626 to a format of a communication protocol supported by client computing devices 604, 606, or 608.

Security services associated with MCS 622 may manage security authentication for requests received from any of client computing devices 604, 606, or 608. Security services associated with MCS 622 may protect the integrity of customer processes and enterprise data. To prevent system or data from being compromised, security authentication may occur when a request is received from client computing devices 604, 606, or 608. Security authentication may be performed before a request is dispatched for processing by cloud infrastructure system 602. The security authentication determined for a user may enable a user associated with a mobile computing device to have authorization to request services via MCS 622. The security authentication may reduce efforts for a user to authenticate for different requests and/or services requested via MCS 622. Security services associated with MCS 622 may be implemented as one or more functional blocks or modules configured to perform various operations authenticating security of a request.

Authentication services associated with MCS 622 may manage security authentication for requests received from client computing devices 604, 606, or 608. Authentication services associated with MCS 622 may determine security authentication for a user associated with a computing device that sends a request to MCS 622. Security authentication may be determined based on a time period, which may be tied to operation of an app (e.g., launching an app), a request, a computing device, an enterprise computer system, other criterion related to a request, or combinations thereof. Security authentication may be verified and granted for any one of the following, such as an individual request, one or more enterprise computer systems, a particular service, a type of service, a user, a computing device, other criterion for determining security authentication, or combinations thereof. In some embodiments, cloud infrastructure system 602 may store authentication information of users received from enterprise computer systems or authentication systems supporting enterprise computer systems. Cloud infrastructure system 602 may determine authentication by performing a lookup function to determine whether an identity of a user associated with a request has authority to make such a request. The stored authentication information may include information such as the type of requests, functions, enterprise computer systems, enterprise data, or the like that a user may be authorized to access. In some embodiments, infrastructure system 602 may initiate communication with a requesting computing device to determine authentication.

In some embodiments, security authentication may be determined based on a role associated with a user requesting a service. The role may be associated with a user requesting access to MCS 622. In some embodiments, a user may request services as a subscriber or tenant of MCS 622 who may be granted access to resources and/or services provided by MCS 622. Authentication may correspond to a user's subscription to MCS 622, such that a user may be authorized to request services via MCS 622 as a subscriber. In some embodiments, the subscription may be limited to a particular set of resources provided by MCS 622. Security authentication may be based on the resources and/or services accessible to the user of MCS 622. In some embodiments, a request may be provisioned a template during execution called a "runtime environment." The runtime environment may be associated with resources that are allocated for a request, a user, or a device.

In some embodiments, authentication services associated with MCS 622 may request an identity management system to determine security authentication for the user. The identity management system may be implemented by cloud infrastructure system 602 (e.g., as identity management 614) or by another computer system that is external to cloud infrastructure system 602. Identity management 616 may determine security authentication of the user based on the user's role or subscription for accessing MCS 622. The role or subscription may be assigned privileges and/or entitlements with respect to an enterprise computer system, a service provided by an enterprise computer system, a function or feature of an enterprise computer system, other criterion for controlling access to an enterprise computer system, or combinations thereof.

Various different application development frameworks (ADFs) may be provided by application development frameworks (ADFs) 624 in cloud infrastructure system 602. ADFs 624 provide the infrastructure code to implement agile SOA based applications. ADFs 624 further provide a visual and declarative approach to development through one or more development tools (e.g., Oracle JDeveloper 11 g development tool). One or more frameworks provided by ADFs 624 may implement a Model-View-Controller design pattern. Such frameworks offer an integrated solution that covers all the layers of the MVC architecture with solutions to such areas as Object/Relational mapping, data persistence, reusable controller layer, rich Web user interface framework, data binding to UI, security and customization. Extending beyond the core Web based MVC approach, such frameworks also integrate with the Oracle SOA and WebCenter Portal frameworks simplifying the creation of complete composite applications.

In certain embodiments, ADFs 624 make it easy to develop agile applications that expose data as services by coupling a service interface to built-in business services provided by cloud infrastructure system 602. This separation of business service implementation details is performed in ADFs 624 via metadata. Use of this metadata-driven architecture enables application developers to focus on the business logic and user experience, rather than the details of how services are accessed. In certain embodiments, ADFs 624 store implementation details of services in metadata in a model layer. This enables developers to exchange services without modifying the user interface, making the application extremely agile. Additionally, the developer creating the user interface does not need to bother with business service access details. Instead, developers can focus on developing the application interface and interaction logic. Creating the user experience can be as simple as dragging-and-dropping the desired business services onto a visual page designer and indicating what type of component should represent that data.

In various embodiments, developers interact with ADFs 624 to create modules forming enterprise applications. The enterprise applications can be executed within the context of cloud infrastructure system 602. In various embodiments, developers interact with ADFs 624 to create modules forming mobile applications. The mobile applications can be executed within the context of cloud infrastructure system 602. Features of the present invention described below may be implemented using any desired combination of programming language and application development framework as will be apparent to one skilled in the relevant arts by reading the disclosure provided herein.

One or more frameworks provided by ADFs 624 may be embodied as Oracle ADF in one example. Accordingly, a framework in ADFs 624 can be based on a Model-View-Controller (MVC) design pattern. An MVC application is separated into: 1) a model layer that handles interaction with data-sources and runs the business logic, 2) a view layer that handles the application user interface, and 3) a controller that manages the application flow and acts as the interface between the Model and the View layers. Separating applications into these three layers simplifies maintenance and reuse of components across applications. The independence of each layer from the others results in a loosely coupled, Service Oriented Architecture (SOA).

In various embodiments, ADFs 624 provide tools and resources allowing developers to create an application in the form of multiple layers, each layer containing code modules/files implementing desired logic according to pre-defined specification. Thus, in one embodiment, ADFS 624 enables the application to be developed as four layers: a view layer containing code modules/files that provide the user interface of the application, a controller layer containing code modules that control the flow of the application, a model layer containing data/code modules that provide an abstraction layer for the underlying data, and a business services layer containing code modules that provide access to data from various sources and handles business logic.

In certain embodiments, ADFs 624 let developers choose the technology they prefer to use when implementing each of the layers. EJB, Web Services, JavaBeans, JPA/EclipseLink/TopLink objects, and many others can all be used as Business Services for ADFs 624. View layers can include Web based interfaces implemented with JSF, Desktop Swing applications and MS Office front ends, as well as interfaces for mobile devices.

In one aspect, the view layer represents the user interface of the application being developed. The view layer can include desktop, mobile, and browser-based views, each of which provides all or a portion of the user interface and is accessible in a variety of manners corresponding to view type. For example, web pages may be sent by the application in response to receiving client requests containing corresponding URLs. The web pages may then be displayed by a browser on a display unit (not shown) associated with a requesting client system, thereby enabling users of the requesting client system to interact with the enterprise application. ADFs 624 support multi-channel access to business services allowing reuse of business services and access from a Web client, a client-server swing desktop-based application, Microsoft Excel spreadsheets, mobile devices such as a smart-phone, or the like.

The code files/modules forming the view layer (such as web pages) may be implemented using one or more of hypertext markup language (HTML), Java server pages (JSP), and Java Server Faces (JSF). Alternatively, the user interface may be implemented using Java components such as Swing, and/or extensible markup language (XML). As further noted, the user interface may leverage a user's experience and familiarity with desktop applications, such as Word and Excel by Microsoft.

As noted above, the relevant user-developed code/data modules are provided in each of the layers. However, each layer typically contains other pre-defined code/data modules provided by ADFs 624. Some of the pre-defined modules may be used during development, for example, as templates for developing the web pages, for including desired functionality in the developed code etc. Other pre-defined modules (such as a URL rewriting module) may be deployed along with the developed application and may provide additional functionalities (mapping of requested URLs to internal names) to the user during execution of the enterprise application.

A controller layer contains code modules/files that control the flow of the application. Each controller object contains software instructions and/or data implemented according to a desired manner of presenting information in the view layer. The desired manner may include the specific web pages to be displayed when links in another web page are clicked/selected by the user, the page to be displayed when errors occur during execution, indicating the specific data to be stored/retrieved, etc.

In one aspect, the controller layer manages the applications flow and handles user input. For example, when a Search button is clicked on a page, the controller determines what action to perform (do a search) and where to navigate to (the results page). There are two controller options for web-based applications in JDeveloper: the standard JSF controller or the ADF Controller that extends the JSF controller functionality. Whichever controller is used, application flow is typically designed by laying out pages and navigation rules on a diagram. An application's flow can be broken into smaller, reusable task flows; include non-visual components such as method calls and decision points in a flow; and create "page fragment" flows that run inside a region of a single containing page.

The code modules/files forming the controller layer are often implemented as Java servlets receiving the client requests and sending desired web pages as corresponding responses. Controller objects may also be implemented, for example, as Apache Jakarta Struts controllers or according to the JSF standard.

A model layer contains data/code modules that connect various business services to the objects that use them in the other layers, such as to the controller objects discussed above or directly to desktop applications as shown. Each abstract data objects of the model layer provides a corresponding interface that can be used to access any type of business service, executing in an underlying business service layer. The data objects may abstract the business service implementation details of a service from a client and/or expose data control methods/attributes to view components, providing a separation of the view and data layers.

In one aspect, the model layer consists of two components, data controls and data bindings, which utilize metadata files to define the interface. Data controls abstract the business service implementation details from clients. Data bindings expose data control methods and attributes to UI components, providing a clean separation of the view and model. Due to the metadata architecture of the model layer, developers get the same development experience when binding any type of Business Service layer implementation to the View and Controller layers.

In certain embodiments, ADFs 624 emphasizes the use of the declarative programming paradigm throughout the development process to allow users to focus on the logic of application creation without having to get into implementation details. At a high level, the development process for a Fusion web application usually involves creating an application workspace. Using a wizard, libraries and configuration needed for technologies selected by a developer are automatically added and an application is structured into projects with packages and directories.

By modeling database objects, an online database or offline replica of any database can be created, definitions edited, and schemas updated. Using an UML modeler, use cases can then be created for the application. Application control and navigation can also be designed. Diagrammers can be used to visually determine the flow of application control and navigation. Then, an underlying XML file describing the flow can be automatically created. A resource library can be used to allow a developer to view and use imported libraries by simply dragging and dropping them into the application. From database tables, entity objects can be created using wizards or dialogs. From those entity objects, view objects are created to be used by pages in the application. Validation rules and other types of business logic can be implemented.

In this example, a business services layer manages interaction with a data persistence layer. It provides such services as data persistence, object/relational mapping, transaction management, and business logic execution. The business services layer can be implemented in any of the following options: as simple Java classes, EJB, Web services, JPA objects, and Oracle ADF Business Components. In addition, data can be consumed directly from files (XML or CSV) as well as REST. Thus, each business service manages interaction with a corresponding data persistence layer, and also provides such services as object/relational mapping, transaction management, business logic execution, etc. The business services layer may be implemented using one or more of simple Java classes, Enterprise Java Beans, web services, etc.

Business components represent a business service implemented using, for example, Oracle ADF Business Components, to provide interaction with databases, web services, legacy systems, application servers, and the like. In one embodiment, business components of the business services layer contain a mixture of application modules, view/query objects, and entity objects, which cooperate to provide the business service implementation. An application module can be a transactional component/code module that UI clients communicate with for working with application/transaction data. The application module may provide an updatable data model and also procedures/functions (commonly referred to as service methods) related to user transactions.

An entity object may represent a corresponding row in a database table and simplifies the manipulation (update, deletion, etc.) of the data stored in the corresponding row. An entity object often encapsulates business logic for the corresponding row to ensure that the desired business rules are consistently enforced. An entity object may also be associated with other entity objects to reflect relationships existing between rows stored in the underlying database.

Figure 7:
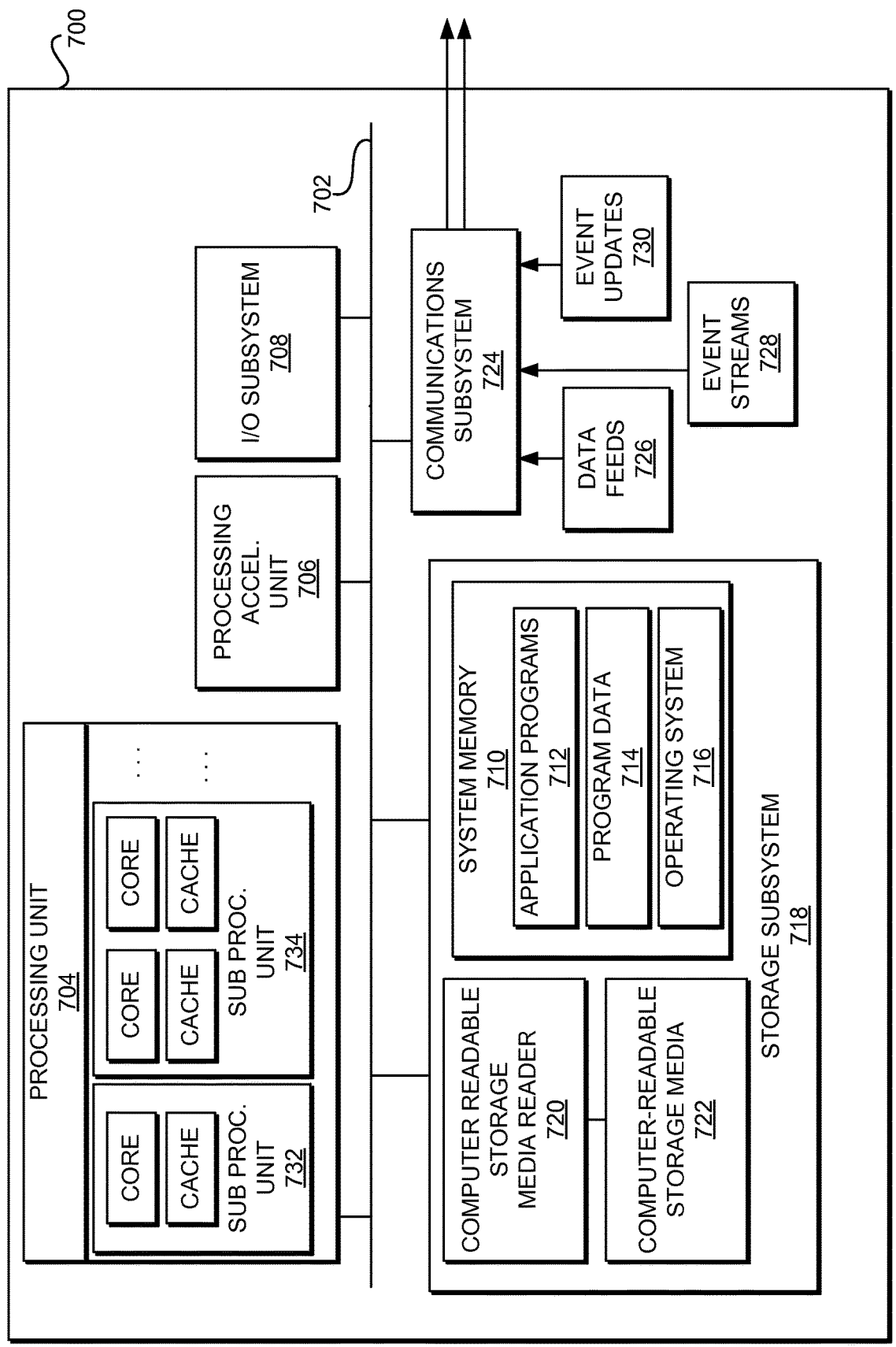
FIG. 7 illustrates an exemplary computer system, in which various embodiments of the present invention may be implemented.

FIG. 7 illustrates an exemplary computer system 700, in which various embodiments of the present invention may be implemented. The system 700 may be used to implement any of the computer systems described above. As shown in FIG. 7, computer system 700 includes bus subsystem 702 and processing unit 704 that communicates with a number of peripheral subsystems via bus subsystem 702. These peripheral subsystems may include processing acceleration unit 706, I/O subsystem 708, storage subsystem 718, and communications subsystem 724. Storage subsystem 718 includes tangible computer-readable storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 704, which can be implemented as one or more integrated circuits (e.g., a conventional microprocessor or microcontroller), controls the operation of computer system 700. One or more processors may be included in processing unit 704. These processors may include single core or multicore processors. In certain embodiments, processing unit 704 may be implemented as one or more independent processing units 732 and/or 734 with single or multicore processors included in each processing unit. In other embodiments, processing unit 704 may also be implemented as a quad-core processing unit formed by integrating two dual-core processors into a single chip.

In various embodiments, processing unit 704 can execute a variety of programs in response to program code and can maintain multiple concurrently executing programs or processes. At any given time, some or all of the program code to be executed can be resident in processor(s) 704 and/or in storage subsystem 718. Through suitable programming, processor(s) 704 can provide various functionalities described above. Computer system 700 may additionally include a processing acceleration unit 706, which can include a digital signal processor (DSP), a special-purpose processor, and/or the like.

I/O subsystem 708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 700 may comprise a storage subsystem 718 that comprises software elements, shown as being currently located within a system memory 710. System memory 710 may store program instructions that are loadable and executable on processing unit 704, as well as data generated during the execution of these programs.

Depending on the configuration and type of computer system 700, system memory 710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 704. In some implementations, system memory 710 may include multiple different types of memory, such as static random access memory (SRAM) or dynamic random access memory (DRAM). In some implementations, a basic input/output system (BIOS), containing the basic routines that help to transfer information between elements within computer system 700, such as during start-up, may typically be stored in the ROM. By way of example, and not limitation, system memory 710 also illustrates application programs 712, which may include client applications, Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 718 may also provide a tangible computer-readable storage medium for storing the basic programming and data constructs that provide the functionality of some embodiments. Software (programs, code modules, instructions) that when executed by a processor provide the functionality described above may be stored in storage subsystem 718. These software modules or instructions may be executed by processing unit 704. Storage subsystem 718 may also provide a repository for storing data used in accordance with the present invention.

Storage subsystem 700 may also include a computer-readable storage media reader 720 that can further be connected to computer-readable storage media 722. Together and, optionally, in combination with system memory 710, computer-readable storage media 722 may comprehensively represent remote, local, fixed, and/or removable storage devices plus storage media for temporarily and/or more permanently containing, storing, transmitting, and retrieving computer-readable information.

Computer-readable storage media 722 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 700.

By way of example, computer-readable storage media 722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to connect to one or more devices via the Internet. In some embodiments communications subsystem 724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

In some embodiments, communications subsystem 724 may also receive input communication in the form of structured and/or unstructured data feeds 726, event streams 728, event updates 730, and the like on behalf of one or more users who may use computer system 700.

By way of example, communications subsystem 724 may be configured to receive data feeds 726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 724 may also be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to output the structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method comprising:

receiving, at a font source, a request to render a portion of text in a source document, wherein the request is received in response to: (i) an agent of a client parsing the source document to identify one or more rendering calls associated with the portion text, (ii) the agent determining one or more intended fonts associated respectively with the one or more rendering calls, and (iii) the agent generating the request to include the portion of text and a set of instructions, commands, or hints used by the font source to render the portion of the text using the one or more intended fonts associated respectively with the one or more rendering calls;

determining, with one or more processors associated with the font source, one or more fonts for rendering the portion of the text, wherein the determining comprises: (i) checking one or more rules or policies that manage the determination of the one or more fonts based on the set of instructions, commands, or hints for the one or more intended fonts, and (ii) determining the one or more fonts for rendering the portion of the text based on the one or more rules or policies and the set of instructions, commands, or hints, and wherein the one or more intended fonts determined by the agent and the one or more fonts determined by the font source are the same or different one or more fonts;

generating, with the one or more processors associated with the font source, one or more raster or bitmap images representing the portion of the text rendered in the one or more fonts determined by the font source, wherein the one or more raster or bitmap images are generated with different resolutions based on criteria associated with a manner in which a system-independent version of the source document will be used including a type of screen and a type of device that the system-independent version of the source document will be viewed;

generating, with the one or more processors associated with the font source, a set of rendering instructions for the client, wherein the set of rendering instructions include the one or more raster or bitmap images that represent the portion of the text in the one or more fonts, which allows the client to include the one or more raster or bitmap images in the system-independent version of the source document on the type of screen and the type of device that the system-independent version of the source document will be viewed; and sending, with the one or more processors associated with the font source, the set of rendering instructions to the client causing the agent to generate the system-independent version of the source document based at least on the set of rendering instructions, wherein the system-independent version of the source document comprises the one or more raster or bitmap images and other portions of the source document.

2. The method of claim 1, wherein generating, with the one or more processors associated with the font source, the one or more raster or bitmap images representing the portion of the text rendered in the one or more fonts, comprises generating one or more raster images each representative of at least one character in the portion of text.

3. The method of claim 1, wherein generating, with the one or more processors associated with the font source, the one or more raster or bitmap images representing the portion of the text rendered in the selected font comprises generating a bitmap image representative of the portion of text.

4. The method of claim 1, wherein the one or more intended fonts determined by the agent and the one or more fonts determined by the font source are the same one or more fonts.

5. The method of claim 1, wherein the one or more intended fonts determined by the agent and the one or more fonts determined by the font source are different one or more fonts, and wherein the determining the one or more fonts for rendering the portion of the text based on the one or more rules or policies and the set of instructions comprises determining the one or more fonts as one or more substitution or preferred fonts to be used to render the portion of the text rather than the intended one or more fonts.

6. The method of claim 1, further comprising packaging the set of rendering instructions and the one or more raster or bitmap images into a response to the request to render the portion of text.

7. A non-transitory computer-readable medium storing a computer program product which when executed by one or more processors of a font source causes the one or more processors to:
receive a request to render a portion of text in a source document, wherein the request is received in response to: (i) an agent of a client parsing the source document to identify one or more rendering calls associated with the portion text, (ii) the agent determining one or more intended fonts associated respectively with the one or more rendering calls, and (iii) the agent generating the request to include the portion of text and a set of instructions, commands, or hints used by the font source to render the portion of the text using the one or more intended fonts associated respectively with the one or more rendering calls;
determine one or more fonts for rendering the portion of the text, wherein the determining comprises: (i) checking one or more rules or policies that manage the determination of the one or more fonts based on the set of instructions, commands, or hints for the one or more intended fonts, and (ii) determining the one or more fonts for rendering the portion of the text based on the one or more rules or policies and the set of instructions, commands, or hints, and wherein the one or more intended fonts determined by the agent and the one or more fonts determined by the font source are the same or different one or more fonts;
generate one or more raster or bitmap images representing the portion of the text rendered in the one or more fonts determined by the font source, wherein the one or more raster or bitmap images are generated with different resolutions based on criteria associated with a manner in which a system-independent version of the source document will be used including a type of screen and a type of device that the system-independent version of the source document will be viewed;
generate a set of rendering instructions for the client, wherein the set of rendering instructions include the one or more raster or bitmap images that represent the portion of the text in the one or more fonts, which allows the client to include the one or more raster or bitmap images in the system-independent version of the source document on the type of screen and the type of device that the system-independent version of the source document will be viewed; and
send the set of rendering instructions to the client causing the agent to generate the system-independent version of the source document based at least on the set of rendering instructions, wherein the system-independent version of the source document comprises the one or more raster or bitmap images and other portions of the source document.

8. The non-transitory computer-readable medium of claim 7, wherein to generate the one or more raster or bitmap images representing the portion of the text rendered in the selected one or more fonts, the computer program product causes the one or more processors to generate one or more raster images each representative of at least one character in the portion of text.

9. The non-transitory computer-readable medium of claim 7, wherein to generate the one or more raster or bitmap images representing the portion of the text rendered in the selected font the computer program product causes the one or more processors to generate a bitmap image representative the portion of text.

10. The non-transitory computer-readable medium of claim 7, the one or more intended fonts determined by the agent and the one or more fonts determined by the font source are the same one or more fonts.

11. The non-transitory computer-readable medium of claim 7 wherein the one or more intended fonts determined by the agent and the one or more fonts determined by the font source are different one or more fonts, and wherein the determining the one or more fonts for rendering the portion of the text based on the one or more rules or policies and the set of instructions comprises determining the one or more fonts as one or more substitution or preferred fonts to be used to render the portion of the text rather than the intended one or more fonts.

12. The non-transitory computer-readable medium of claim 7, wherein the computer program product causes the one or more processors to package the set of rendering instructions and the one or more raster or bitmap images into a response to the request to render the portion of text.

13. A method comprising:
receiving, at an agent of a client device, a first document;
parsing, with one or more processors associated with the agent, the first document to identify one or more rendering calls to render a portion of text in at least one font;
determining, with one or more processors associated with the agent, one or more intended fonts associated respectively with the one or more rendering calls;
generating, with the one or more processors associated with agent, a request to a font source accompanied by the portion of text and a set of instructions, commands, or hints for rending the portion of the text using the one or more intended fonts associated respectively with the one or more rendering calls;

sending, with the one or more processors associated with agent, the request to the font source such that the font source can determine one or more fonts for rendering the portion of the text, wherein the determining comprises: (i) checking one or more rules or policies that manage the determination of the one or more fonts based on the set of instructions, commands, or hints for the one or more intended fonts, and (ii) determining the one or more fonts for rendering the portion of the text based on the one or more rules or policies and the set of instructions, commands, or hints, and wherein the one or more intended fonts determined by the agent and the one or more fonts determined by the font source are the same or different one or more fonts;

receiving, at the agent, a set of rendering instructions, generated by the font source, wherein the set of rendering instructions include one or more raster or bitmap images that represent the portion of the text in the determined one or more fonts, which allows the one or more computer systems to include the one or more raster or bitmap images in a second document and the one or more raster or bitmap images that represent the portion of the text is generated, by the font source, based on the determined one or more fonts, wherein the one or more raster or bitmap images are generated with different resolutions based on criteria associated with a manner in which the second document will be used including a type of screen and a type of device that the second document will be viewed;

generating, with the one or more processors associated with the agent, the second document based on the set of instructions, the second document including the one or more raster or bitmap images and other portions of the first document.

14. The method of claim 13, wherein generating, with the one or more processors associated with the agent, the request to the font source based on the one or more rendering calls comprises crafting a request using the portion of text.

15. The method of claim 13, wherein receiving, at the agent, the set of instructions generated by the font source comprises receiving one or more raster images generated by the font source each representative of at least one character in the portion of text.

16. The method of claim 13, wherein generating, with the one or more processors associated with the agent, the second document based on the set of instructions comprise inserting the one or more raster or bitmap images representative of the portion of the text into the first document.

17. A non-transitory computer-readable medium storing a computer program product which when executed by the one or more processors of the one or more computer systems causes the one or more processors to implement the method of claim 13.

* * * * *

UNITED STATES PATENT AND TRADEMARK OFFICE
CERTIFICATE OF CORRECTION

PATENT NO. : 10,572,575 B2
APPLICATION NO. : 14/486279
DATED : February 25, 2020
INVENTOR(S) : Butler Page 1 of 1

It is certified that error appears in the above-identified patent and that said Letters Patent is hereby corrected as shown below:

In the Specification

In Column 1, Line 8, delete "visitors" and insert -- visitor --, therefor.

In Column 5, Line 52, delete "UNIXO" and insert -- UNIX® --, therefor.

In Column 17, Line 19, delete "support a formats" and insert -- support formats --, therefor.

Signed and Sealed this
Twenty-seventh Day of October, 2020

Andrei Iancu
*Director of the United States Patent and Trademark Office*